F. B. MILES & J. LAWRENCE.

Improvement in Machines for Making Nails.

No. 5,153. Reissued Nov. 19, 1872.

WITNESSES. Wm. A. Steel
John K. Ruperting

F. B. Miles
and J. Lawrence
by their Attys
Howson and Son.

AM. PHOTO-LITHOGRAPHIC CO. N.Y. (OSBORNE'S PROCESS.)

UNITED STATES PATENT OFFICE.

FREDERICK B. MILES AND JOHN LAWRENCE, OF PHILADELPHIA, PENNSYLVANIA, ASSIGNORS TO JOHN LAWRENCE.

IMPROVEMENT IN MACHINES FOR MAKING NAILS.

Specification forming part of Letters Patent No. 129,156, dated July 16, 1872; reissue No. 5,153, dated November 19, 1872.

DIVISION B.

*To all whom it may concern:*

Be it known that we, FREDERICK B. MILES and JOHN LAWRENCE, of Philadelphia, county of Philadelphia, State of Pennsylvania, have invented certain Improvements in Nail-Plate Feeders, of which the following is a specification:

Our invention consists of certain improvements, too fully explained hereafter to need preliminary description, in plate-feeding boxes for cut-nail machines and in mechanism for operating the said boxes and the feed-rolls.

Figure 3:
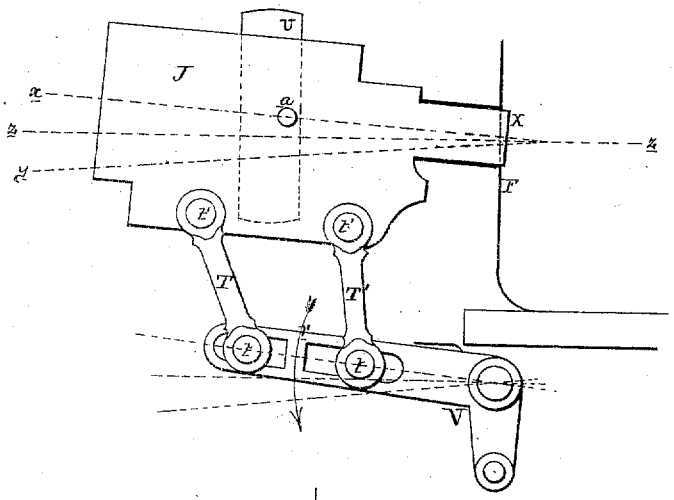
Figure 2:
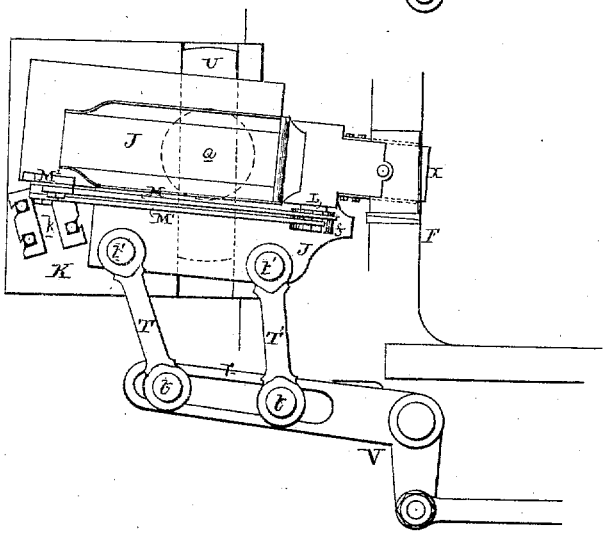
Figure 1:
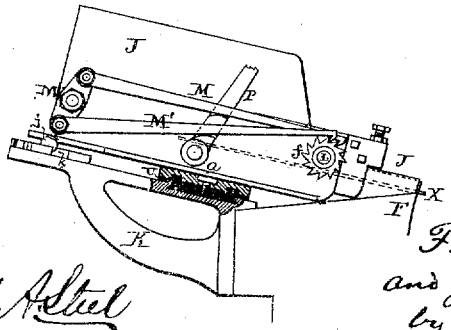

In the accompanying drawing, Figure 1 is a side elevation, partly in section, of a plate-feeding box with our improvements; Fig. 2, a plan view of the same; and Fig. 3, a diagram, illustrating the compound movement of the box.

For automatically feeding plates from a reservoir-box to the cutters of a nail-machine it is necessary that the said box should be inclined, first in one direction and then in the other, so as to present the plates to the cutters at such an angle as to form blanks of the proper taper, and so that the widest ends of the tapering blanks shall be presented alternately toward the heading-dies at the opposite sides of the machine. It is also necessary that the whole box should be moved laterally as well as inclined so that the wide ends of the blanks may project from the griping-dies, first on one side and then on the other, in order that sufficient of each blank may be presented to form the nail-head. This compound movement of the feed-box is obtained in a manner, and through the medium of devices, which we will now proceed to describe.

The box J is similar to that shown in the patent of F. Davison of July 16, 1872, and is supported in an inclined position partly by the fixed cutter F of the nail-machine and partly by a bracket, K, secured to the same. The box is pivoted at *a* to a transverse sliding bar, U, adapted to guides in the bracket; but instead of connecting the said bar by a single link to the bell-crank-operating lever V, and causing the box, when adjusted laterally by the bar, to be inclined by striking set-screws, as in the aforesaid patent of F. Davison, we dispense with the set-screws altogether, and connect the box directly to the operating-lever by two links, T and T′, which are rendered adjustable upon the said lever, and, if necessary, upon the box also, and by means of which the said box can be moved laterally and at the same time inclined to the required extent, the compound movement being positive and unvarying, and the product of the machine much more uniform than when the single link and set-screws are employed. The compound movement of the box will be best understood on reference to the diagram, Fig. 3, where *x* represents the center line of the box when at the limit of its movement in one direction; *y*, the center line when it has reached the limit of its movement in the opposite direction; and *z*, the center line when the box is midway between these two positions and at right angles to the face of the cutter. On the movement of the lever V in the direction of the arrow, Fig. 3, the box will be moved laterally in the same direction with the sliding bar U, and will, at the same time be turned upon its pivot *a* until it assumes first the position and angle indicated by the center line *z* and then the position indicated by the line *y*; and on reversing the motion of the lever V the same compound movement will be imparted to the box, but in a reverse direction. The two positions *x* and *y*, it will be understood, indicate the angles which the box is caused to assume when the plate held by the same is severed by the descending cutter of the nail-machine. The extent of the lateral throw and inclination of the box is dependent upon the position of the points where the links T T′ are connected to the arm *r* of the operating-lever, and it will be observed that the pins *t′*, on the box to which the links are connected, are permanent, while the pins *t* are adjustable on the vibrating arm *r*. The nearer the pin *t* of the link T is adjusted to the fulcrum of the bell-crank lever V the less will be the vibratory movement of the outer end of the box, and the further the pin of the other link T′ is adjusted from the said fulcrum the greater will be the vibration at the inner end of the box; hence, by the adjustment of these pins *t* the extent of the vibration at either end of the box can be varied at pleasure within certain limits, and, consequently, the end of the nail-plate held by the box may be made to assume any required angle in respect to the cutting-knife, and blanks of different tapers can be cut by the said knife, according to the character of the nail to be produced.

Not only is this important end attained by the described differential mechanism, but the lateral movement of the entire box causes the exposure and projection from between the griping-dies of sufficient of the blanks to enable the latter to be headed first on one side and then on the other.

It is not absolutely necessary that the pins *t'*, by which the links are connected to the side of the box, should be fixed, as these pins, as well as the pins on the vibrating arm *r*, might be rendered adjustable, and in some instances the latter pins might be fixed and the required adjustments be made with the pins *t* only.

The nail-plates X are withdrawn from the box and fed to the cutters by geared feed-rolls, between which the said plates pass, an intermittent movement being imparted to the rolls as the box vibrates in order to cause the projection from the end of the box at the proper intervals of sufficient of the plate to form the required blank. To impart this intermittent movement to the feed-rolls we use the devices illustrated in Figs. 1 and 2, which we will now proceed to describe. At the extremity of the spindle L of the upper feed-roll is a ratchet-wheel, *f*, of sufficient width of face to receive the hooked ends of two alternately-moving pawls, M and $M^1$, connected to the opposite arms of a lever, $M^2$, which has its fulcrum at the side of the feed-box. A roller at the extremity of the lower arm of the lever $M^2$ slides through an inclined groove, K, on the fixed frame, as the feed-box is vibrated laterally, and thus rocks the lever and imparts the required alternate movement to the pawls, one of the latter turning the ratchet-wheel as the box vibrates in one direction, and the other performing a similar duty when the box is vibrated in the opposite direction. A double cam-lever, P, hung to the side of the feed-box, is used for the purpose of lifting both of the pawls simultaneously from the teeth of the ratchet-wheel when it is necessary to stop the movement of the rollers and the feeding of the plates.

We claim as our invention—

1. The combination, substantially as described, of a nail-plate box, pivoted to a transverse slide, U, with a vibrating arm, *r*, and connecting-links T and T', adjustable at one or both ends.

2. The combination, substantially as described, of the ratchet-wheel *f*, alternately-moving pawls M and $M^1$, the lever $M^2$ hung to the feed-box, and the fixed inclined groove K.

3. The combination of the double cam-lever P, hung to the feed-box, with the pawls M and $M^1$, for the purpose specified.

In testimony whereof we have signed our names to this specification in the presence of two subscribing witnesses.

FREDK. B. MILES.
J. LAWRENCE.

Witnesses to the signature of F. B. MILES:
J. SHERBORNE SINGER,
O. C. FERRIS.

Witnesses to the signature of J. LAWRENCE:
WM. A. STEEL,
HUBERT HOWSON.